US009818269B1

(12) United States Patent
Ghodke

(10) Patent No.: US 9,818,269 B1
(45) Date of Patent: Nov. 14, 2017

(54) STATUS LIGHT DATA TRANSMISSION

(71) Applicant: Ninad H. Ghodke, Santa Clara, CA (US)

(72) Inventor: Ninad H. Ghodke, Santa Clara, CA (US)

(*) Notice: Subject to any disclaimer, the term of this patent is extended or adjusted under 35 U.S.C. 154(b) by 0 days.

(21) Appl. No.: 15/382,371

(22) Filed: Dec. 16, 2016

(51) Int. Cl.
G08B 5/38 (2006.01)
H04N 7/18 (2006.01)
G06K 9/00 (2006.01)

(52) U.S. Cl.
CPC .......... G08B 5/38 (2013.01); G06K 9/00671 (2013.01); H04N 7/185 (2013.01)

(58) Field of Classification Search
CPC ....... G08B 5/38; G06K 9/00671; H04N 7/185
See application file for complete search history.

(56) References Cited

U.S. PATENT DOCUMENTS 8,520,065 B2* 8/2013 Staats ................... G01S 5/0009
348/61
2006/0239675 A1* 10/2006 Iizuka ................ H04B 10/1125
396/287
2014/0270799 A1* 9/2014 Roberts ................ H04B 10/116
398/130
2016/0123600 A1* 5/2016 Phillips ................ H04B 10/116
99/337
2016/0164605 A1* 6/2016 Liu ....................... H04B 10/116
398/118
2016/0267195 A1* 9/2016 Iizuka .................... G06Q 10/20

OTHER PUBLICATIONS

OpenCV, Itseez, 2016 available at http://opencv.org/.
Asynchronous serial communication, Wlkipedia, 2016, https://en.wikipedia.org/wiki/Asynchronous_serial_communication.
Computer POST and beep codes, Computer Hope, 2016, available at http://www.computerhope.com/beep.htm.
All the Linux/C error codes are listed below, Mar. 2009 available at http://www.virtsync.com/c-error-codes-include-errno.
HSL and HSV, Wikipedia 2016, available at https://en.wikipedia.org/wiki/HSL_and_HSV.
Aliasing and Moire patterns, Rick Matthews, 2016, http://users.wfu.edu/matthews/misc/DigPhotog/alias/.
On-board diagnostics, Wikipedia, 2016 available at https://en.wikipedia.org/wiki/On-board_diagnostics.

* cited by examiner

Primary Examiner — Brian Zimmerman
Assistant Examiner — Sara Samson
(74) Attorney, Agent, or Firm — Douglas L. Weller

(57) ABSTRACT

To transmit information, a status light is located on a device. Information is broadcast from the device by controlled blinking of the status light. A computing device captures a video stream of the blinking status light utilizing a camera. The computing device decodes the video stream to extract the information.

20 Claims, 21 Drawing Sheets

STATUS LIGHT DATA TRANSMISSION

BACKGROUND

Diagnostic and status information provided by portable and embedded devices, if available, is typically transmitted using a physical connection such as a universal serial bus connection or a joint test action group (JTAG) connection. Colored lights may be used to indicate limited status condition such as a green light signaling correct operation and a red light signaling an error in operation.

DESCRIPTION OF THE EMBODIMENT

Figure 1:
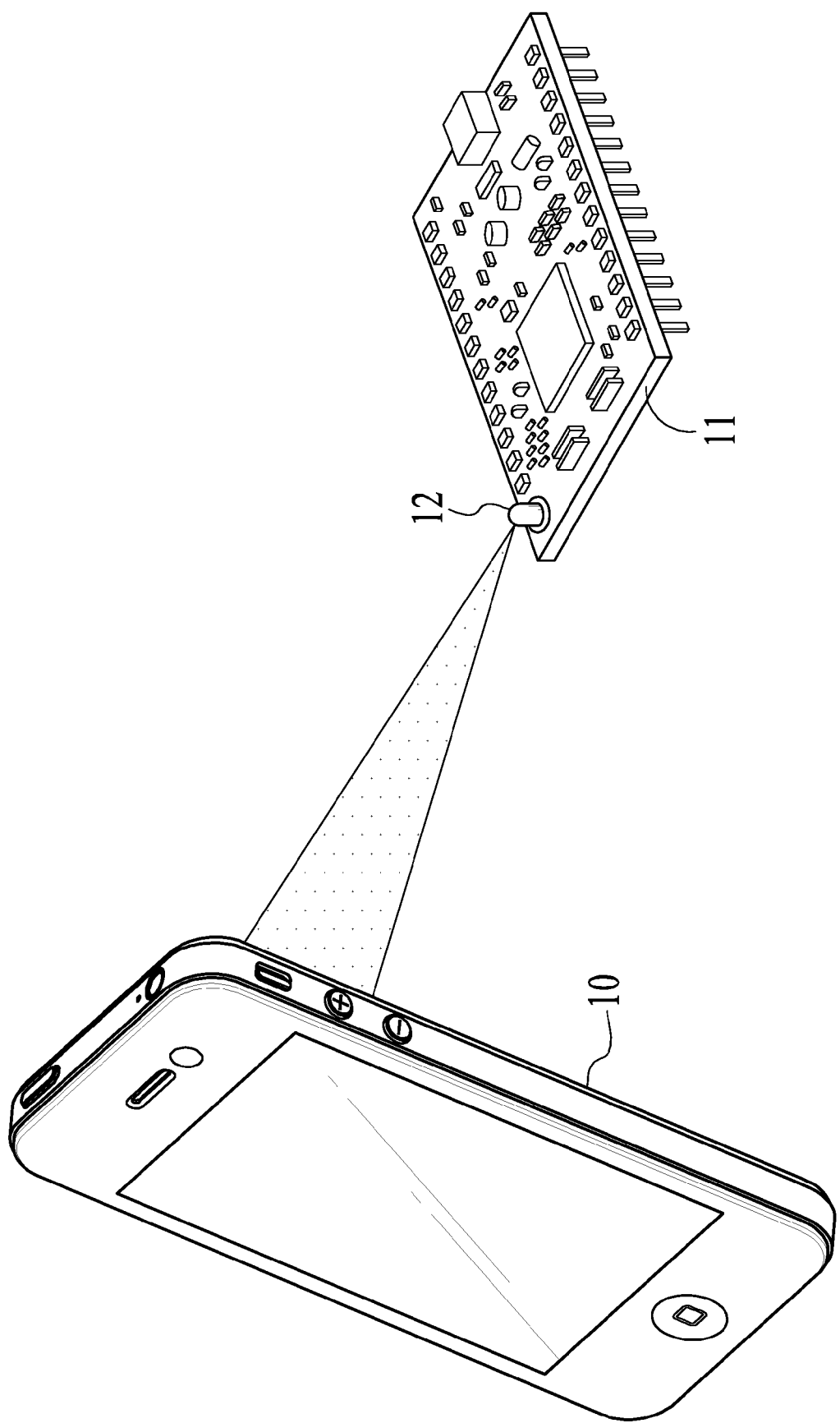
FIG. 1 illustrates a computing device receiving status information encoded in a blinking status light in accordance with an implementation.

A system is presented that allows information to be broadcast by a blinking status light and decoded by a computing device with a camera. For example, the computing device is a smartphone, a tablet computer, a portable computer or some other type of computing device with an embedded camera or access to a camera.

For example, the information is decoded from a captured video stream of the blinking status light by analyzing video frames of the captured video stream. For example, a dynamic calibration of average light intensity is used to allow information transmission in multiple lighting conditions, contrasts in status light placement and across different camera types. For example, a protocol is used that avoids errors due to noise, camera movement and time synchronization between the transmitter and receiver.

For example, state information is extracted from a blinking light source in real time. For example, the blinking light is a light emitting diode (LED) or another light source. For example, the information is diagnostic and configuration information. For example, information obtained by analyzing frames of video feed of the blinking status light is correlated from dictionaries and data available in storage within the computing device or accessed from a remote source such as a web service.

For example, the blinking can be color coded to indicate the severity of the problem. A typical scheme might use red light to indicate fatal failures, a yellow light for warnings and a green light to make notifications. For example, to increase throughput of information, multiple status lights can be used, color of status light can be used to encode and transmit data, and the duty cycle of status light blinking can be increased.

The following activities are considered in order to obtain information from a light source: data transmission, data reception, data interpretation, data analysis, and use of a remote service to customize data interpretation.

Data transmission can utilize known or specially developed protocols. For example, Morse code requires data to be passed as dots and dashes. For example, to utilize Morse code, a status light represents a dot by remaining on for a predetermined duration and represents a dash by remaining on for a multiple of the predetermined duration of a dot. For example, Morse code can be used to transmit alphanumeric data.

Alternatively, for example, a synchronous binary mode of transmission can be used where, for example a binary 1 is represented by a status light ON state and a binary 0 is represented by a status light OFF state.

While in the following discussion a single status light is used to described a binary synchronous data transmission scheme, this is only exemplary as other schemes can be used to transmit data. For example, multiple status lights can be used. When using multiple status lights, each status light can be used to independently transmit a message or multiple status lights can be configured to together send a single message. Also, another medium such as sound or ultrasound can be used.

For example, as discussed below, a protocol discussed further below can be used for data transmission from a device with a status light to a computing device equipped with a camera. The computing device can be a smartphone, a personal computer, a tablet computer or any other computing device equipped with or having access to a camera. If transmission of data is through other media such as sound or ultrasound, a microphone or another appropriate receiving device can be used for reception of the transmission.

For example, FIG. 1 shows a smartphone 10 receiving data from a device 11 equipped with a status light 12. For example, the protocol used to transmit data is a one-way communication protocol in which device 11 through controlled blinking of status light 12 sends data received by a camera implemented on smartphone 10. There is no feedback, flow control or handshake information that passes from smartphone 10 to device 11. Smartphone 10 acts as a computing device that decodes a message from device 11 after filtering out the noise and adjusting for any transmission errors.

Figure 2:
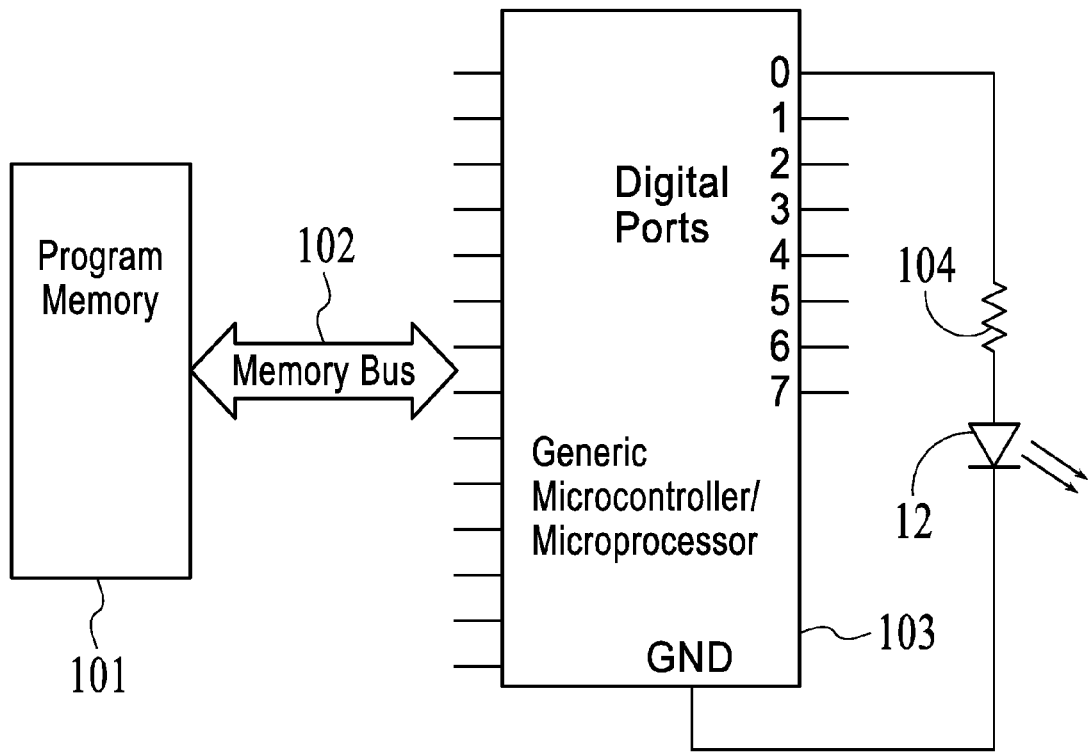
FIG. 2 is a simplified hardware block of a device with a status light in accordance with an implementation.

FIG. 2 is a simplified diagram of device 1 showing device 11 including a microprocessor/microcontroller 103, a program memory 101 and a memory bus 102. Microprocessor/microcontroller 103 controls status light 12 through current generated through a resistor 104 by port of microprocessor/microcontroller 103.

Figure 3:
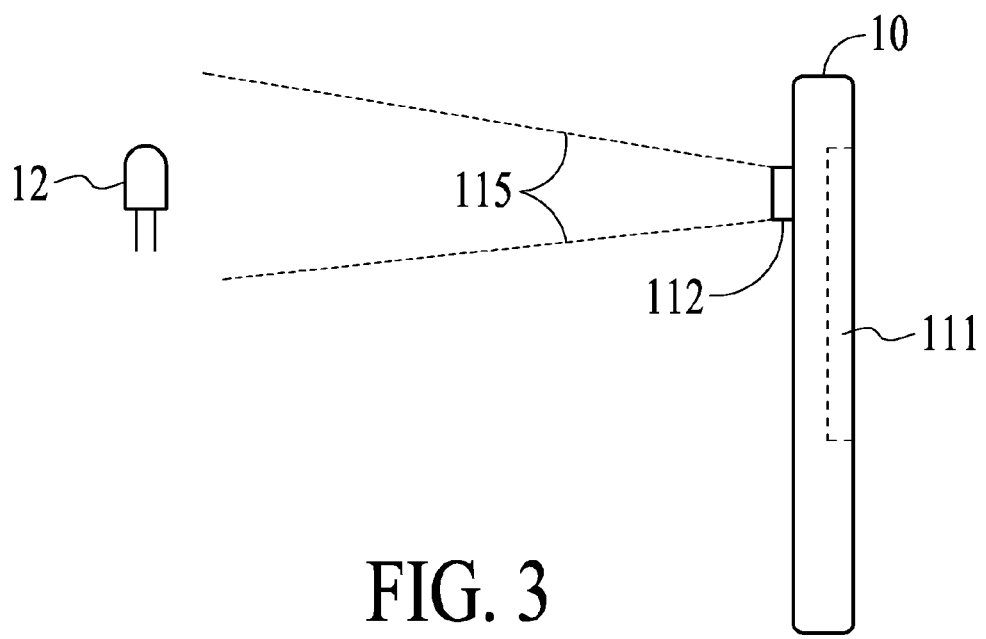
FIG. 3 shows a location of a status light within a light of sight of a camera of a portable device in accordance with an implementation.

FIG. 3 is a simplified diagram illustrating that smartphone 10 includes a display screen 111 and a camera 112. When capturing data from status light 12, camera 112 is pointed at status light 12 so that status light 12 is within line of sight of camera 112, as illustrated by dashed lines 115.

Device 11 controls status light 12 so that status light 12 synchronously transmits binary information by being toggled between an ON state and an OFF state. The frequency of the synchronous transmission is selected so that smartphone 10 captures multiple frames of video for the duration of each state. The frequency of transmission can be increased provided smartphone 10 supports a sufficient frame per second rate and has processing capacity to receive the data transmission. The oversampling provided by capturing multiple frames of video for the duration of each state allows for noise compensation and increases transmission reliability.

For example, transmitted data is logically arranged in 10-bit packets of data. For example, each packet of data consists of a byte of information preceded by a start bit (1) and suffixed by a stop bit (0). For each bit, status light ON represents a binary 1 and status light OFF represents a binary 0. For example, a message consists of packets of header information followed by a variable number of packets of data. The first byte of the header includes a preamble that has a predetermined data pattern (e.g., 11110000) indicating start location of the packet. For example, the entire message is broadcast in a loop and the existence of the preamble allows the receiving device to detect the start of the message. For example, the value used for the preamble is selected to be a value that is not present in any other part of a data packet. For example, if the preamble value appears in another part of the data, the preamble value is followed or preceded by an escape character or sequence that indicates that occurrence of the preamble value within the data is not the actual preamble.

The second byte of the header contains metadata such as protocol version, a mode number and an indication of the number of bytes of data that follow the header. For example, two bits are used to specify mode as follows: "00" indicates a public operating mode, "01" indicates a vendor specific data mode, "10" indicates a customized move and "11" indicates a demo mode.

The third and fourth byte of the header contain an encoded number that identifies a vendor. For example, the vendor is a vendor for device 11. The vendor identification indicates a web server used to interpret data within a transmitted message. A fifth byte of the header can include a hardware identifier and a message identification. For example, the hardware identification identifies device 11 and is selected by the vendor for device 11. The remaining bytes of the message are used to send data. The above described message is only exemplary of a potential message organization For example, in a general purpose mode, there are three bytes of data. The first byte of data contains an error code. The remaining two bytes of data contain application generated identifiers. For example, when data in this mode is received by smartphone 10, smartphone 10 displays the error code to a user.

For example, smartphone 10 receives data by analyzing captured video frames. The captured video frames are processed using open source computer vision (OpenCV) or a similar library of programming functions. Frame by frame analysis of captured video is captured as a Mat object that can be manipulated by applying transformations and other data manipulations.

Figure 4:
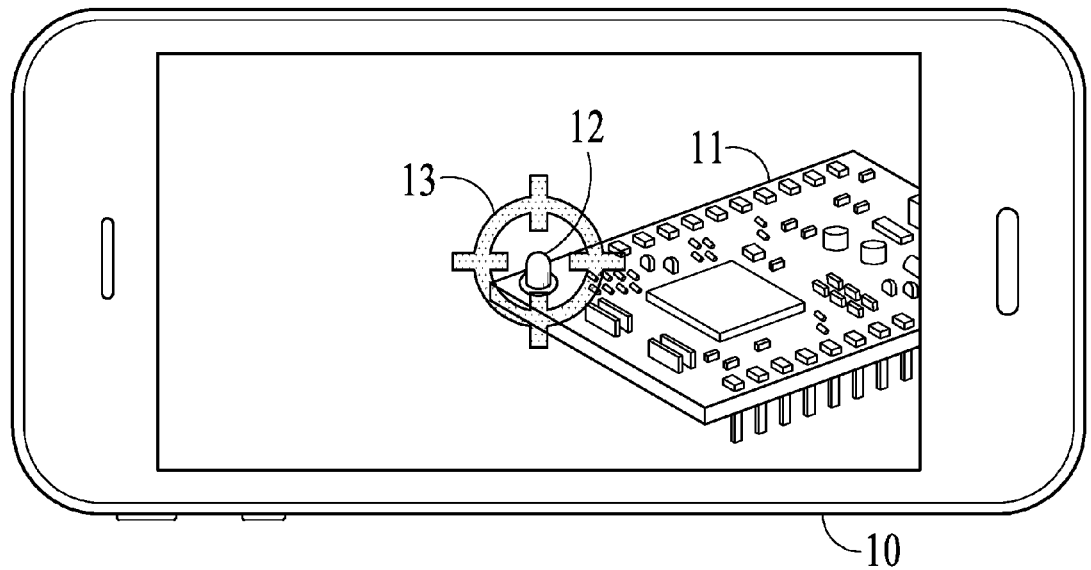
FIG. 4 illustrates a computing device tracking a blinking status light in accordance with an implementation.
Figure 5:
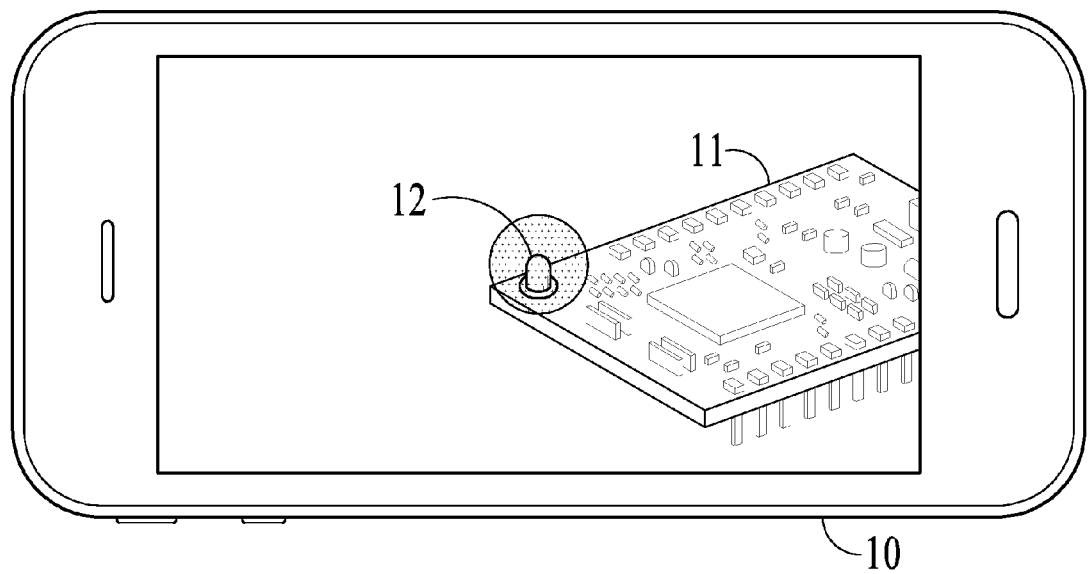
FIG. 5 and FIG. 6 illustrate a computing device thresholding a blinking status light in accordance with an implementation.
Figure 6:
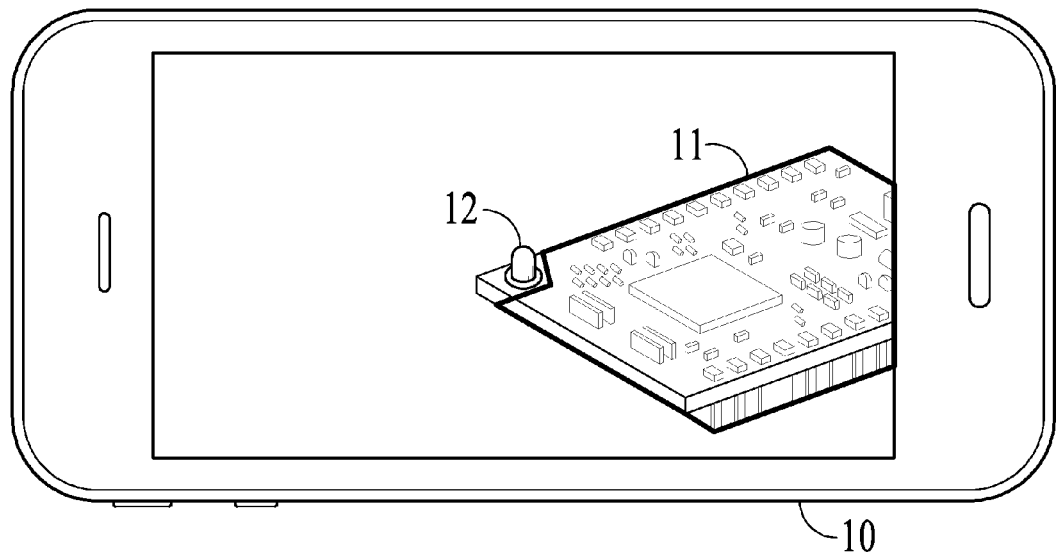

FIG. 4 illustrates status light 12 being tracked by smartphone 10. For example, position identification is accomplished by transforming a captured image into grayscale and then thresholding the image frame. This is illustrated in FIG. 5. The contours in the thresholded image are found. All the polygon shapes in the image frame are identified. Then subsequent frames are compared against each other. The area where brightness differs across frames is then determined to be the position of (blinking) status light 12. Once the position of status light 12 is determined, edge detection is performed for the image. The edges are tracked and used as a reference to detect out where the position of the status light. This is illustrated in FIG. 6.

Using matrix manipulation or other computation to identify position of status light 12, can require significant processing resources. An optimization to reduce computation is to overlay a cross-hair guide in order to assist the use in positioning the camera over status light 12. This is illustrated in FIG. 4 where a crosshair mark 13 appears in display screen 111 of smartphone 10 to allow a user to place the status light in a known location on captured video. This simplifies the process of locating and tracking the status light in captured video images.

Figure 7:
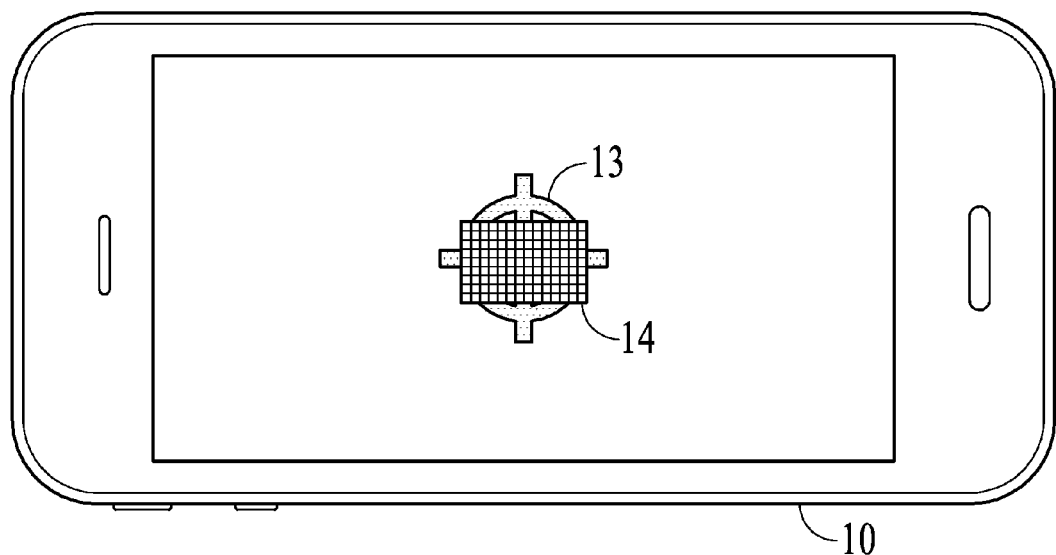
FIG. 7 illustrates a computing device determining a measurement area for detecting state of a status light in accordance with an implementation.

Once the location of status light 12 in a captured video frame is determined, the state of status light 12 can be determined. Status light state measurements are made for the area surrounding the status light. To do this, computations are made only in a small bounded area within which status light 12 lies. This is illustrated by FIG. 7 wherein matrix 14 represents the location of status light 11 on video. For each video frame, matrix 14 is converted from red-green-blue (RGB) format to hue saturation value (HSV) space. The value part is extracted as an array from the HSV space. A mean over this value range is calculated. The calculated mean is used as a reading of brightness for matrix 14 for each captured image frame. Alternatively, other types of computational methods can be used to extract the information from status light 12.

For a color-changing status light, hue can also be captured. For example, color can be interpreted as providing notification (green), providing a warning (yellow) or indicating a failure (red). Alternatively, color is used as a bit value encoder e.g. off is 00, red is 01, yellow is 10, green is 11.

Figure 8:
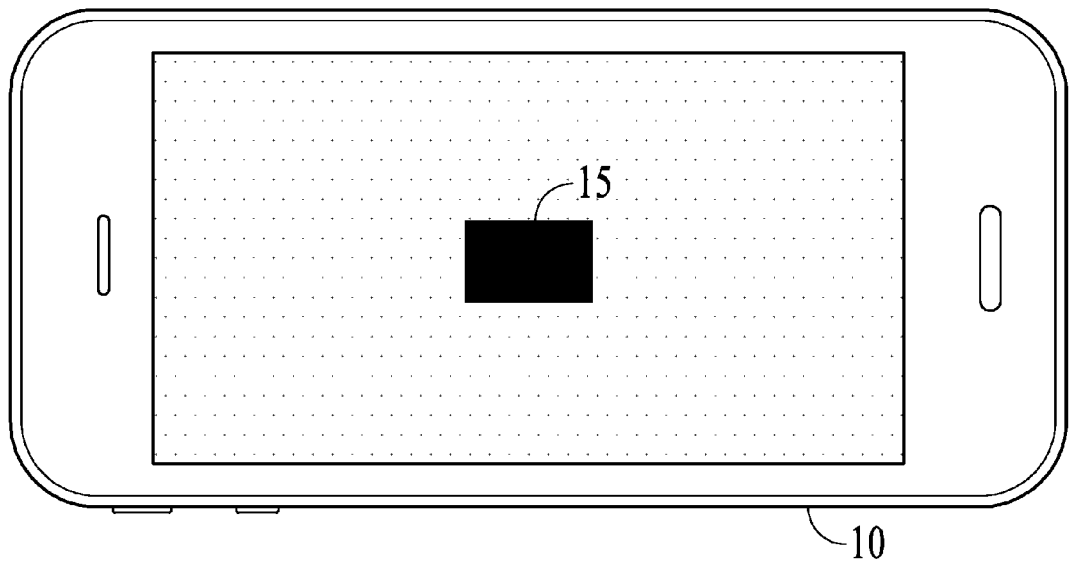
FIG. 8 illustrates a computing device status light an OFF state in accordance with an implementation.
Figure 9:
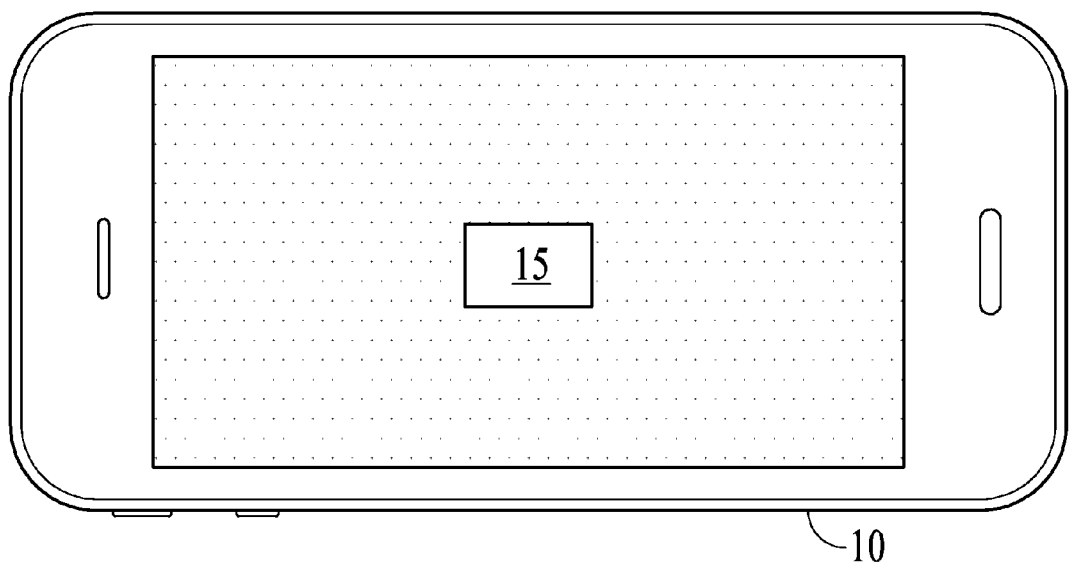
FIG. 9 illustrates a computing device status light an ON state in accordance with an implementation.

The light intensity within matrix 14 is interpreted as a relative value to take into account ambient light and other noise. For example, in FIG. 8 light intensity at location 15 is less intense that light intensity as represented at location 15 in FIG. 9. The state of status light 12 in the image frame represented by FIG. 8 is interpreted as being OFF, while the state of status light 12 in the image frame represented by FIG. 9 is interpreted as being ON.

For example, a moving average of readings is treated as a reference value. The average is determined by using only readings for every $n^{th}$ video frame, for example every third video frame or every fifth video frame, etc. This average represents the neutral state. Any reading below the neutral state average is treated as though the status light is OFF and any reading above the neutral state average is treated as though the status light is ON.

Figure 10:
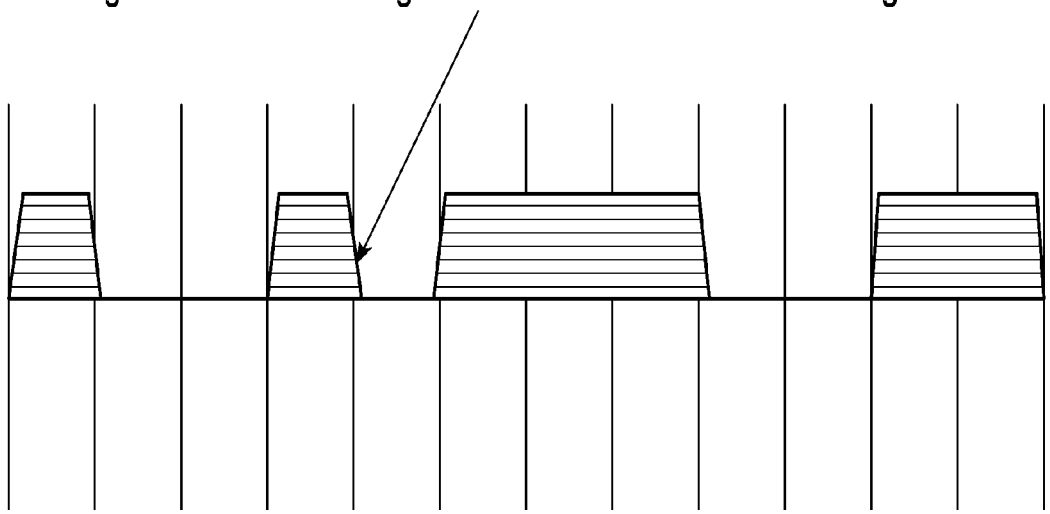
FIG. 10 illustrates recognition of state change bleeding in accordance with an implementation.

As illustrated by a graph 50 in FIG. 10, recognition of state change can bleed into a next time (bit) segment. The bleeding can be caused by the transition time as status light 12 is toggled between an ON state and an OFF state. The bleeding can also be caused by a smoothing function used in the detection algorithms or by computation delays on either smartphone 10 or device 11 or on both smartphone 10 and device 11.

The bleeding can be reconciled, for example, by using level transition triggers. For example, the time interval between two level transitions is calculated. From this time interval is determined the number of bits that would have been transmitted. The bits are fed to a message state machine that stores the bits. Using level transition triggers helps account for the delays and syncing between the transmitter and the receiver. Also because of the presence of the start and stop bits for a packet, even if the individual packet is corrupted the entire message is read. An example of a message state machine is given in FIG. 25.

Figure 11:
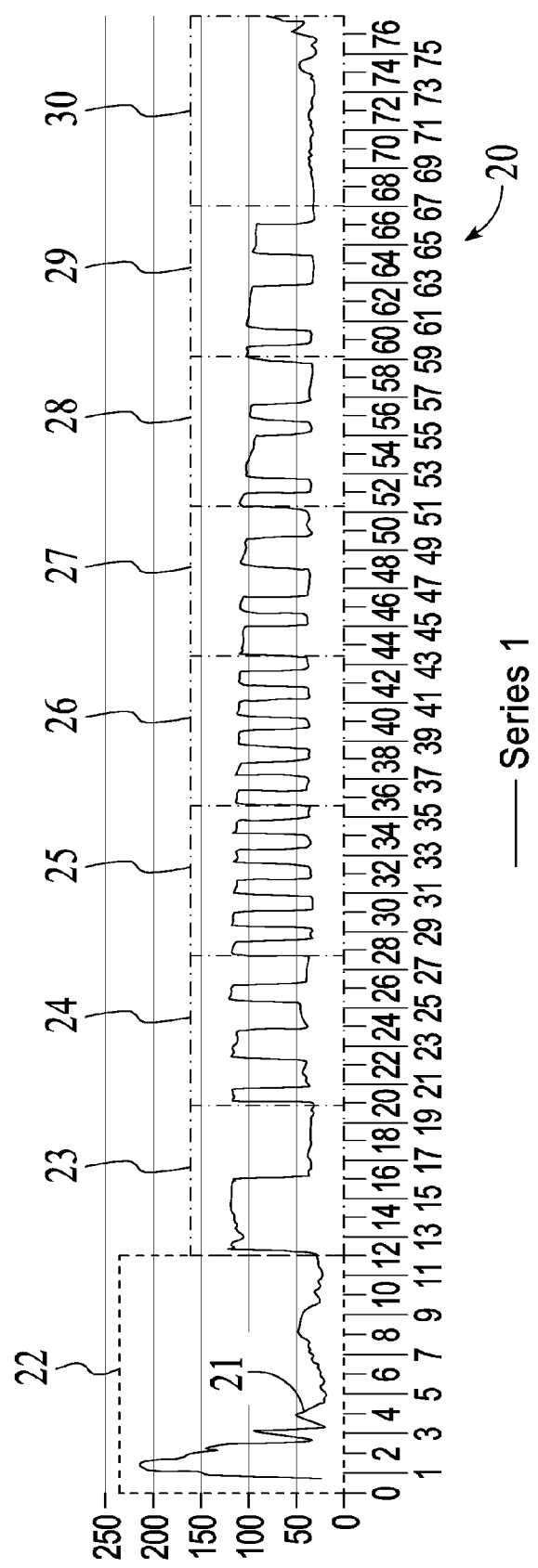
FIG. 11 illustrates brightness and intensity reading made by a computing device in accordance with an implementation.

In FIG. 11, a trace 21 of a graph 20 represents detected light intensity within matrix 14 for a message transmitted using the protocol. In a segment 22, light intensity represents noise. A segment 23 contains the encoded preamble byte for the message. A segment 24 represents the meta data byte for the message. A segment 25 and a segment 26 contain the two bytes that specify the vendor identification. A segment 27 and a segment 28 represent two bytes containing data. In a segment 30, light intensity represents noise.

Alternatively, the bleeding can be reconciled by averaging light intensity readings in a time slice to reconcile a value for a bit of data. For example, the status light state is stored in a fixed queue buffer (FQB). A size of this buffer is chosen depending on the frame rate of the OpenCV video capture and is always odd valued. The state of a bit is calculating based on the majority of the states in that FQB.

Figure 12:
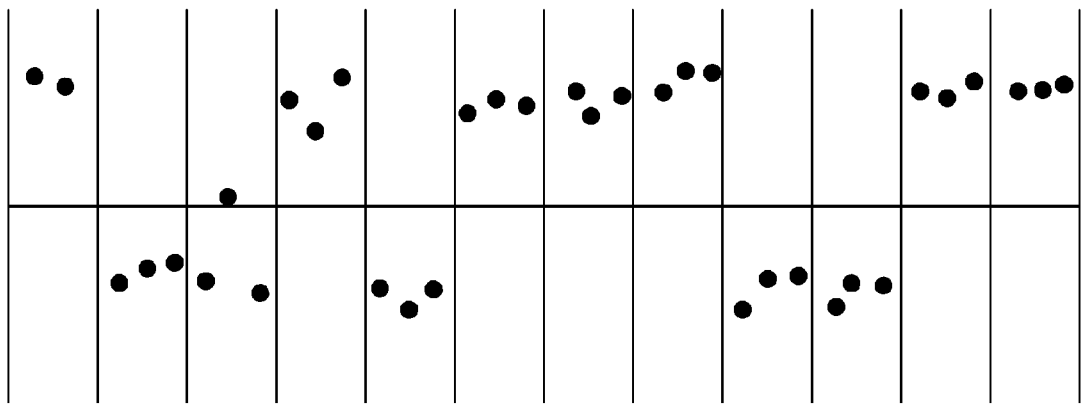
FIG. 12 illustrates light measurements being conducted at regular intervals in accordance with an implementation.

For example, FIG. 12 shows a graph 31 where three intensity reading are made per bit segment. For example, if the frame rate is six frames per second (fps) and a status light bit rate is 2 hertz, six frames are sampled for two bits of data. The size of the FQB is three and by checking the majority of the bit values it is possible to infer what is the state of each bit.

Figure 13:
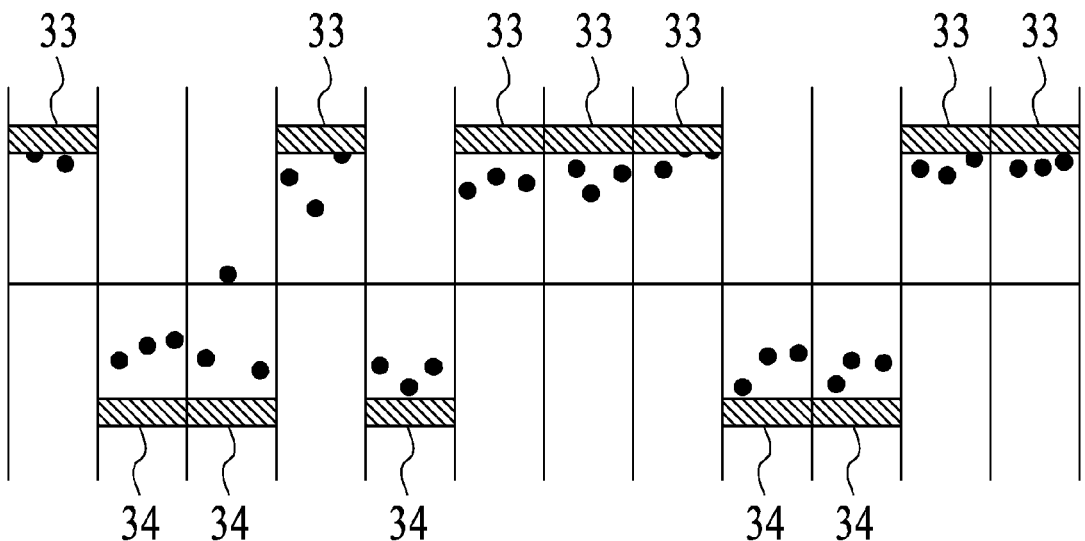
FIG. 13 illustrates deducing an average for time segments in accordance with an implementation.
Figures 14, 15:
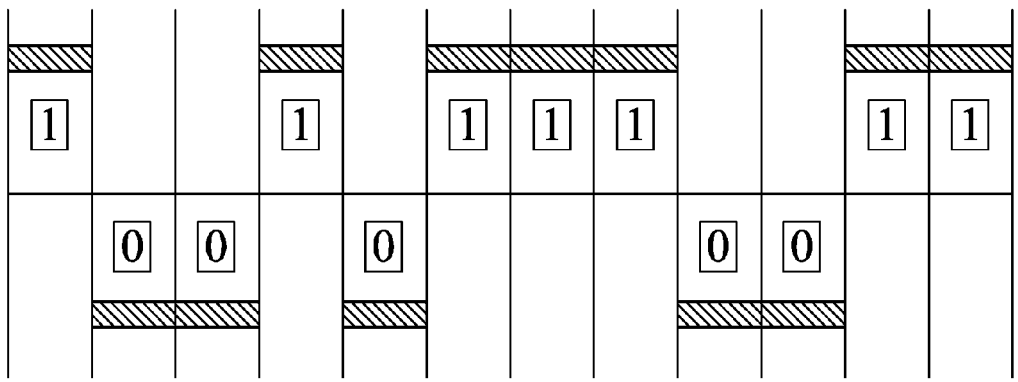
FIG. 14 illustrates inferring a bit value for time segments in accordance with an implementation.
FIG. 15 illustrates creating a message from a bit sequence in accordance with an implementation.

For each bit segment in graph 31, the majority determines the state. Where the majority of intensity readings are in the upper intensity region, the bit is reconciled to being in the ON state. Where the majority of intensity readings are in the lower intensity region, the bit is reconciled to being in the OFF state. Graph 32 of FIG. 13 shows the result of averaging intensity reading of FIG. 12. Where the majority of intensity readings are in the upper intensity region, the bit is reconciled to being in the ON state as represented by a bar 33. Where the majority of intensity readings are in the lower intensity region, the bit is reconciled to being in the OFF state as represented by a bar 34. FIG. 14 shows the final assignment of binary values to the ON state and the OFF state detected by measuring light intensity. One challenge in determining the bit is time drift between the device 11 and smartphone 10.

FIG. 15 shows a packet structure for a byte that consists of data of 8 bits, preceded by a start bit and ending with a stop bit. The start bit and stop bit mark the quality of the packet received. If the state machine reads the wrong value when reading the start bit or the stop bit, the state machine increments the error count. If the error count is above a threshold, the state machine resets the state machine back to expecting preamble. This mechanism helps prevent reading of garbled data. An example of a packet state machine is given in FIG. 28.

Figure 16:
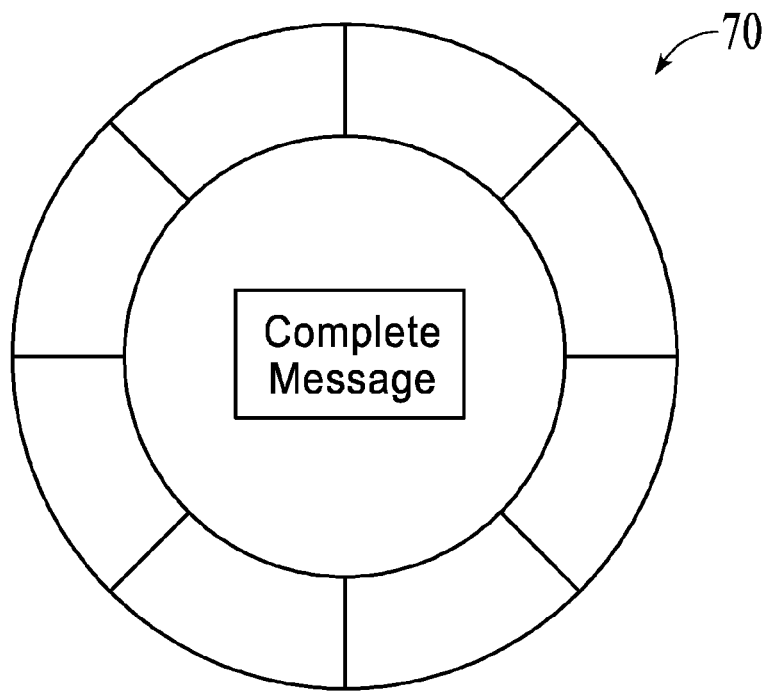
FIG. 16 illustrates creating a complete message in accordance with an implementation.
Figure 17:
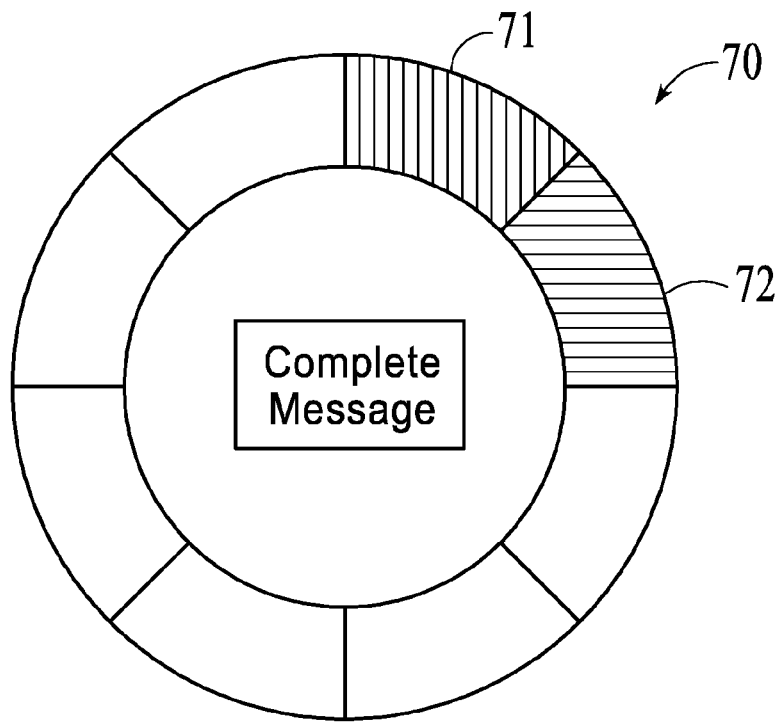
FIG. 17 illustrates analyzing parts of a message in accordance with an implementation.

FIG. 16 shows that a complete message 70 consists of several packets that are transmitted movingly in a loop in order. FIG. 17 shows message 70 includes a preamble 71 and a meta data packet 72.

Device 11 broadcasts a message several times in a loop so the message can be read multiple times and resulting in increasing confidence in the message. Additional error detection/correction algorithms can also be used to increase the fidelity of the data. For example, for every loop, bits of the message are stored and compared to previous readings of the message. The final message is then constructed by setting the bit position at a particular position to be the majority read for that position in all the iterations. In additionally, each byte for every read can be graded based on whether the start bit and stop bit are read correctly.

Data is decoded according to the mode of operation of smartphone 10. For example, in a public operating mode device 11 broadcasts data from a datasheet consisting of error codes such as Linux standard error codes. The first byte of the message is interpreted as an error code and any additional data following it would be interpreted as customized data consisting of ASCII characters that are displayed on display screen 111 of smartphone 10.

In a vendor specific data mode, device 11 broadcasts the messages that can be only decoded using a vendor specific data sheet. For example, a datasheet can be absent if encryption is required.

In a customized mode, an app is provided as a library to a vendor and it is the responsibility of the vendor to decode the data of the message. The message still follows a standard message format with a Preamble and meta-data packets. Alternatively, the message may not follow a standard message format and, for example, can be transmitted as a bit stream only that is interpreted remotely allowing for encryption and security.

In a demo mode, data is interpreted as ASCII characters and displayed on display screen 111 of smartphone 10. For example, demo mode is useful for demonstration purposes and for live debugging of embedded systems.

Figure 18:
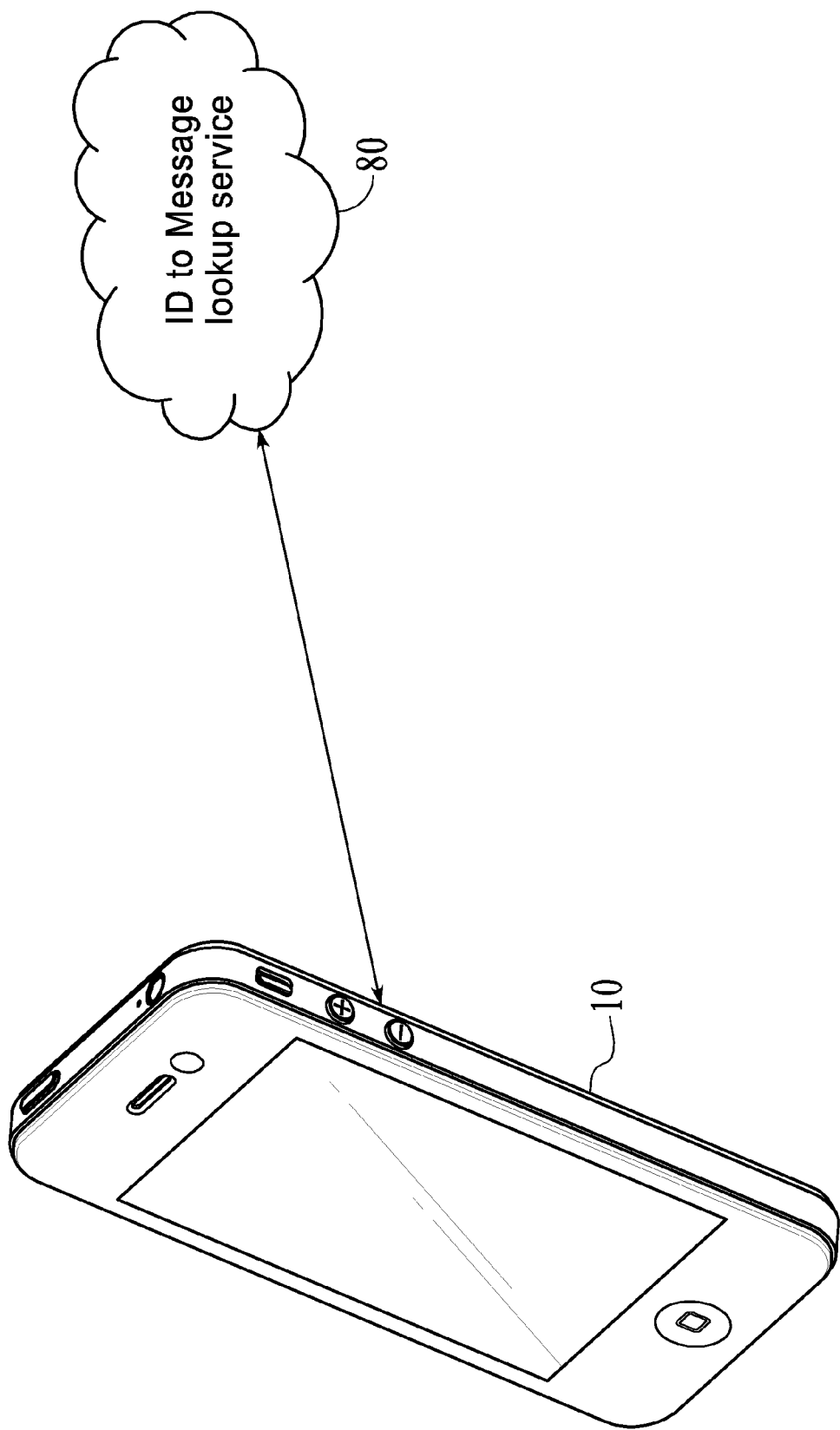
FIG. 18 illustrates consulting a look-up service available through the Internet in accordance with an implementation.

Each received message is decoded to display an error or workaround. This is performed after having established confidence in a message. The message is checked with an existing database on smartphone 10 or via a remote database to decode the data. For example, the database could be contained on a web service that can be cached in a local database. The database could be used to decode a message, for example to provide detailed information about an error and if available to present a solution or work around for a detected error condition. The information, for example, is presented on display screen 111 of smartphone 10. For example, FIG. 18 illustrates smartphone 10 consulting a look-up service available through the Internet 80.

For example, in cases where a message is not decoded successfully, an image of device 11 can be sent to a backend webserver that can do an image analysis to identify a device kind of device 11. The web service then can return a list of top errors associated with error messages for the device.

Figure 19:
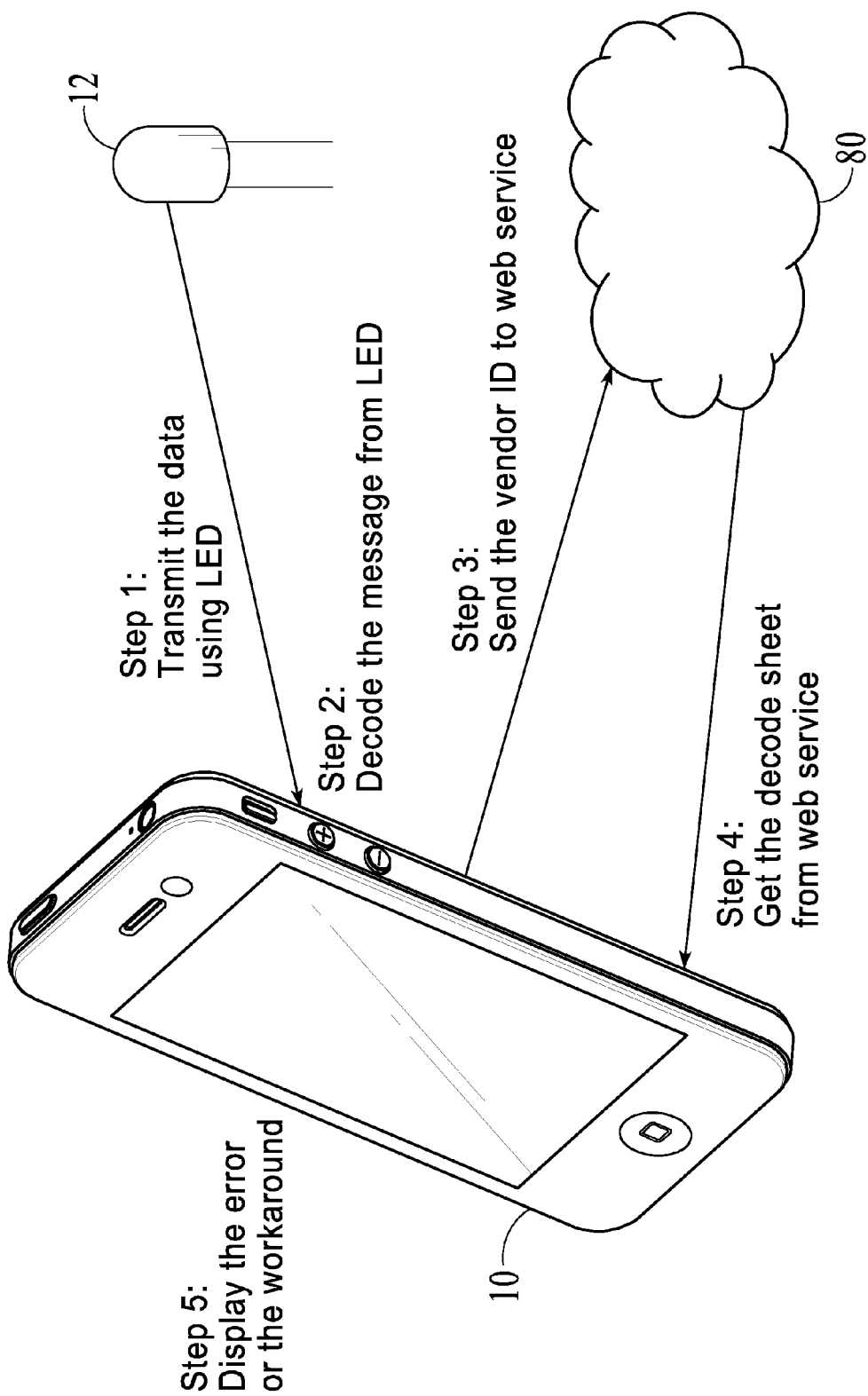
FIG. 19 illustrates an overall mechanism for detecting and decoding a message in accordance with an implementation.

FIG. 19 summarizes the steps of smartphone 10 capturing data transmitted by device 11 using status light 12. Smartphone 10 decodes the message and sends a vendor identification through Internet 80 to a web service. The web service returns a decode sheet. Smartphone 10 then displays an error or workaround obtained by comparing data information decoded from the message with the decode sheet. Alternatively, instead of sending the vendor id, the entire message is sent to the web service and the device receives the decoded message which is displayed on the screen.

For example, every message decoded is transmitted back to a reporting service. If the network is not immediately available, messages are cached and retransmitted whenever the connectivity is established. The reporting service stores the messages in a database with the associated vendor identification and hardware identification. Reports are generated from this data and are accessible only for vendors with certain Service Level Agreements (SLA) and for hardware identifications associated with their registration. The reports are available on a per period basis and only available for the periods as per the SLA.

Reports for error can also be made available to customers of the vendors, for example, allowing reports to be downloaded by customers who can then run their own analytic algorithms on the data. For example, a web service for customizing data interpretation can be made available for vendors to create their identifications, upload datasheets and also to get reports. Profiles of vendors can include, for example, vendor identifications, custom datasheets for vendor devices, uploaded work arounds. Vendor Specific datasheets are made available to be downloaded by computer devices such as smartphone 10 to display the messages and workarounds to the end user.

Status light data transmission can be used as a last resort reporting of issues when all the normal methods of communication have failed and it is desired to extract defect/status information from a device. Status light data transmission can be used to replace blinking keyboard status lights used for example, in Linux kernel when the kernel panics.

Status light data transmission can also be used during configuration or reconfiguration of small form factor devices. This is particularly useful for devices that do not have a mode of transferring secrets or other configuration option until they are ready to use and where the initial configuration relies on hardcoded passwords or unique device identifiers like mac address or serial numbers. Configuration or other secret information stored by a can device can be transmitted by the device using status light data transmission. This information can then be used to configure the device. Secret keys on a device can also be shared via status light data transmission.

Status light data transmission can also be used to provide information useful when debugging trouble when initializing initialization of a device. For example, status light data transmission can provide information pertaining to initialization, helping to identify any specific problem that fails in an initialization phase. The information can be logged for future reference and analysis.

Figure 20:
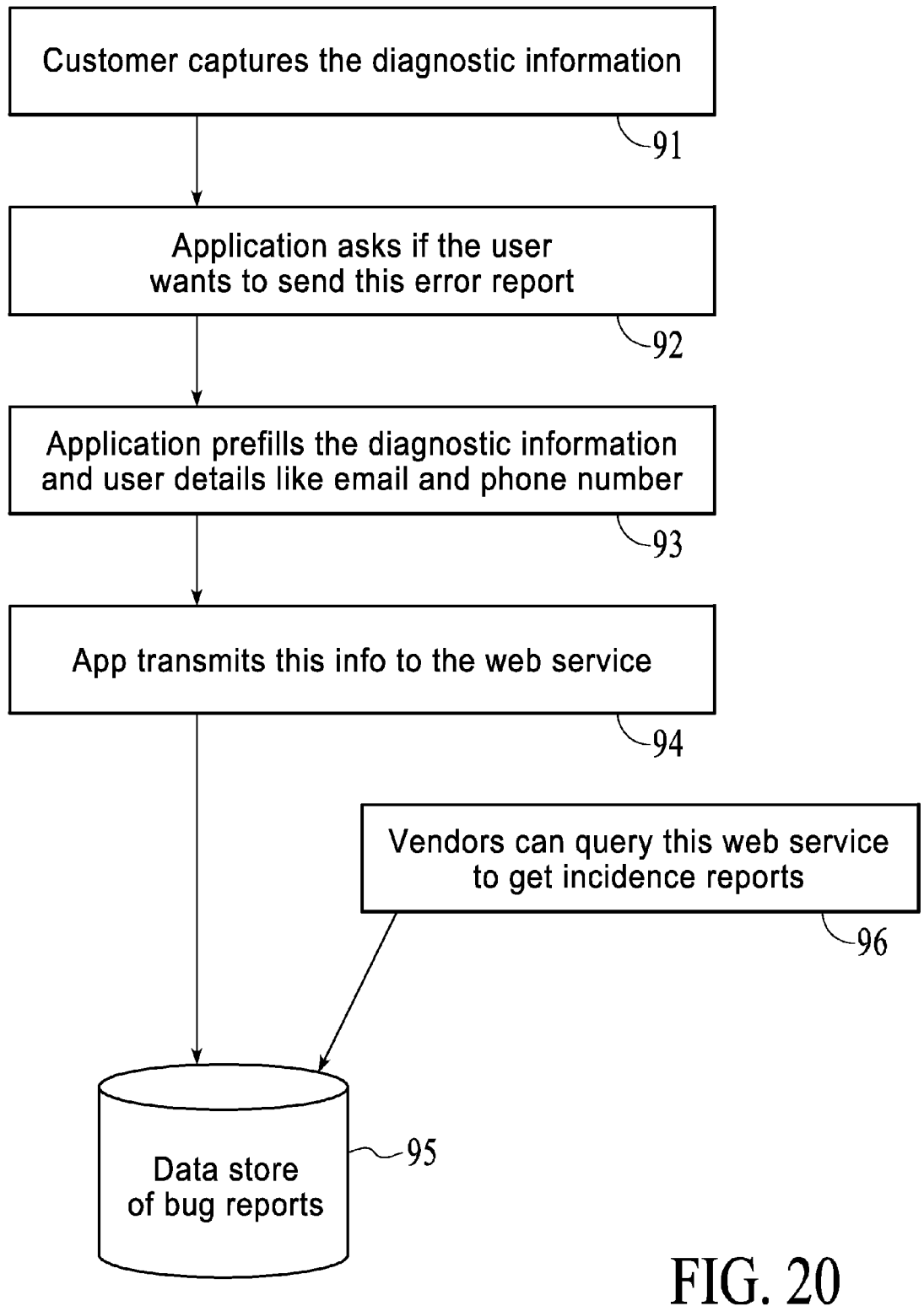
FIG. 20 illustrates bug filing in accordance with an implementation.

FIG. 20 is a simplified flowchart illustrating logging of information. In a block 91, a customer using smartphone 10 captures information transmitted by a status light. In a block 91, an application running on smartphone 10 queries the user if the captured information should be forwarded. If yes, in a block 93 the application prefills the information and user details such as e-mail address and phone number. In a block 94, the application transmits the information to a web service. The web service stores the information in a data store of incidence (bug) reports 95. In a block 96, vendors can query the web service to obtain the incidence reports.

Status light data transmission can also be used to provide information from devices where the direct access is difficult or impeded but a line of sight is available. For example, a cell tower can use a status light to communicate information, alleviating the necessity to physically access the tower to obtain information.

Figure 21:
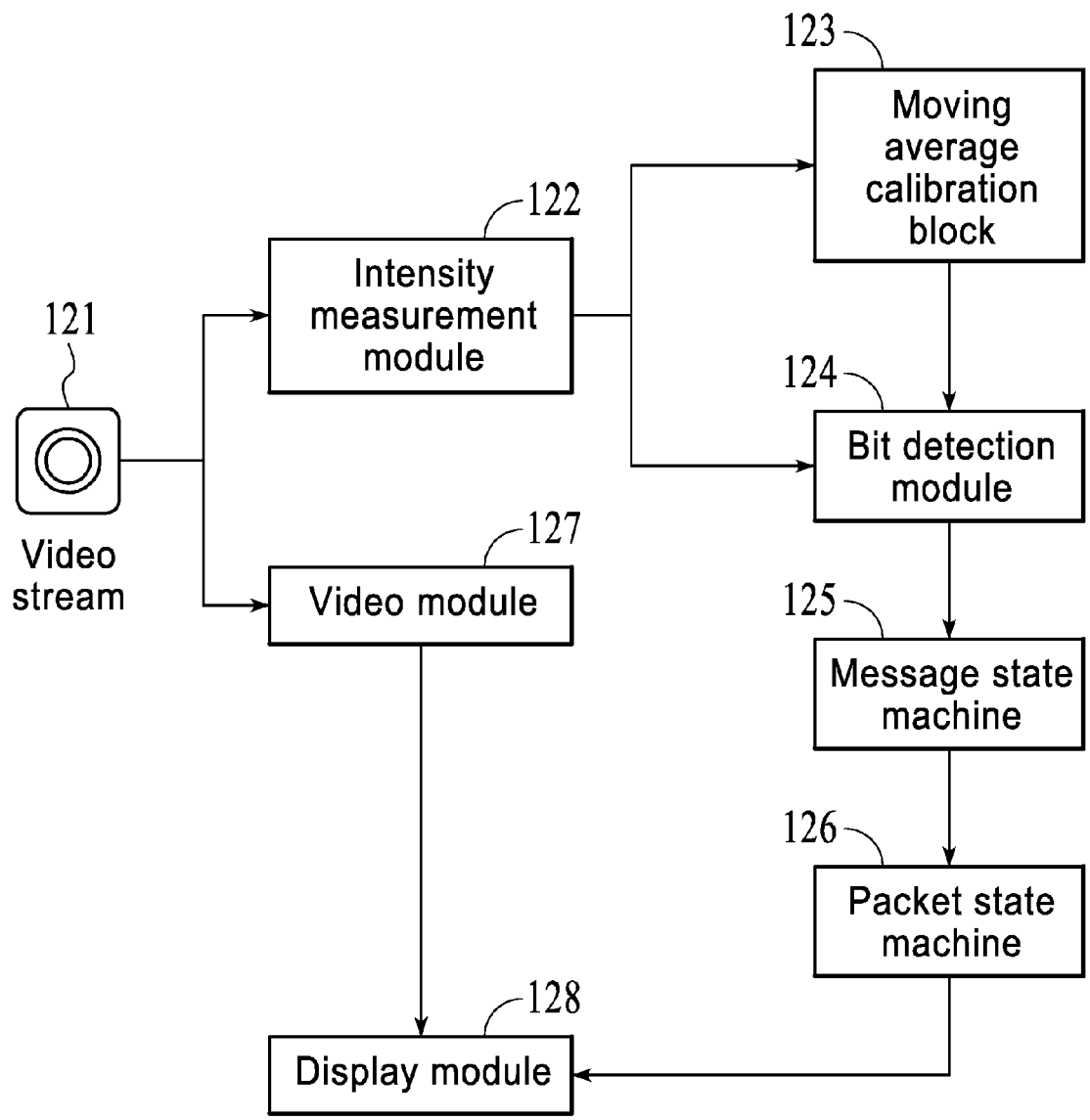
FIG. 21 illustrates logical blocks with a device that detects and decodes a message in accordance with an implementation.

FIG. 21 illustrates logical blocks with a device that detects and decodes a message generated by status light. For example, the modules are implemented as an application run by smartphone 10. A video stream detected by camera 112 of smartphone 10 is received by an intensity measurement module 122. A moving average calibration block 123 generates an average intensity over a predetermined length of time. A bit detection module 124 detects bit values based on input from intensity measurement module 122 and moving average calibration module 123. The values of detected bits are forwarded to a message state machine 125 and a packet state machine 127 to decode the message represented by the series of detected bits. A display module 128, for example, simultaneously displays information from a video module 127 and packet state machine 126.

Figure 22:
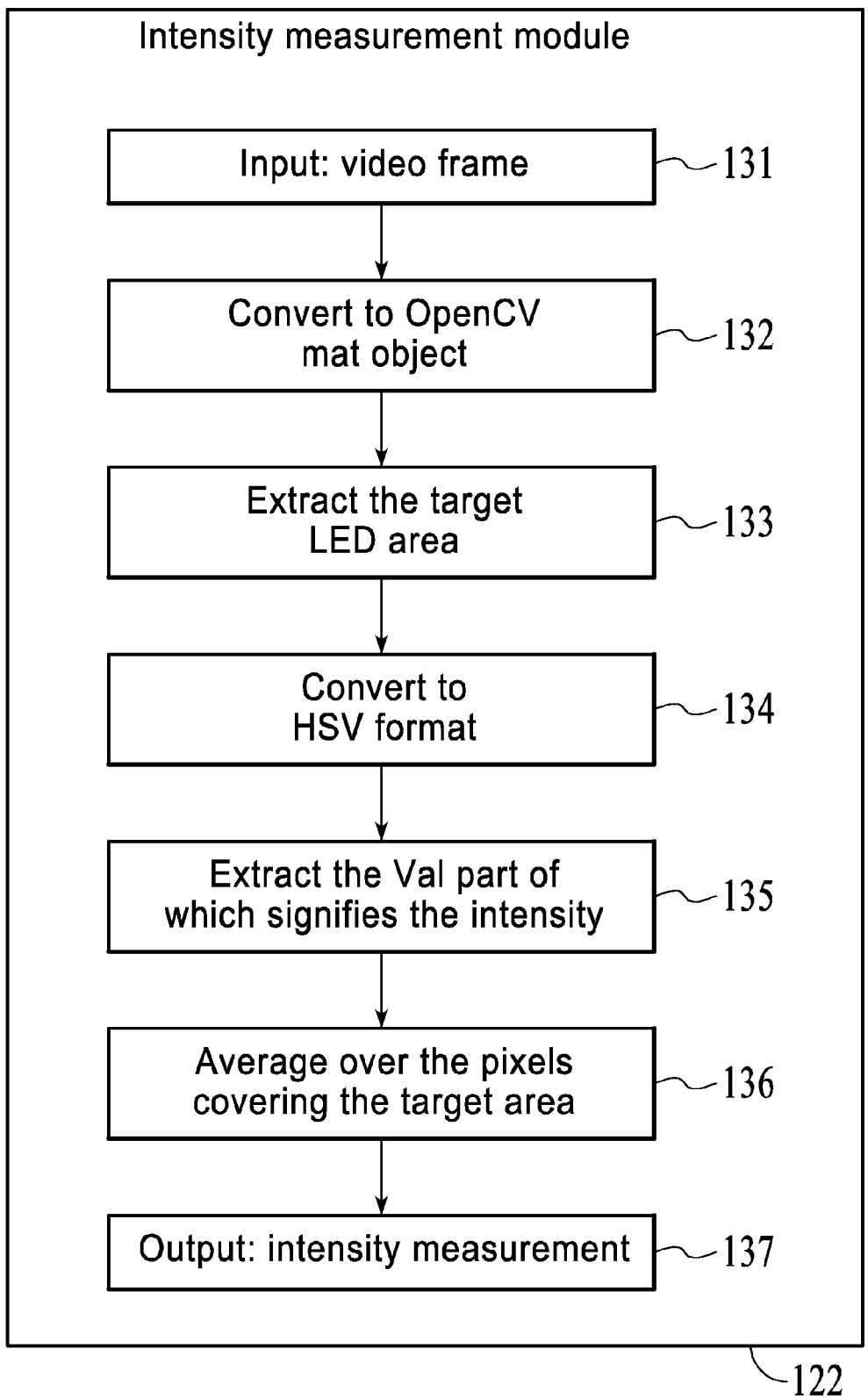
FIG. 22 illustrates operation of an intensity measurement module in accordance with an implementation.

FIG. 22 illustrates operation of intensity measurement module 122. A video frame 131 is converted to an OpenCV Mat object in a block 132. The target LED area is extracted in a block 133. The extracted target LED area is converted to HSV format in a block 134. The Val part of the extracted target LED converted to HSV format is extracted to signify the intensity in a block 135. The average over the pixels converting the target area is performed in a block 137. The resulting intensity measurement is output in a block 137.

Figure 23:
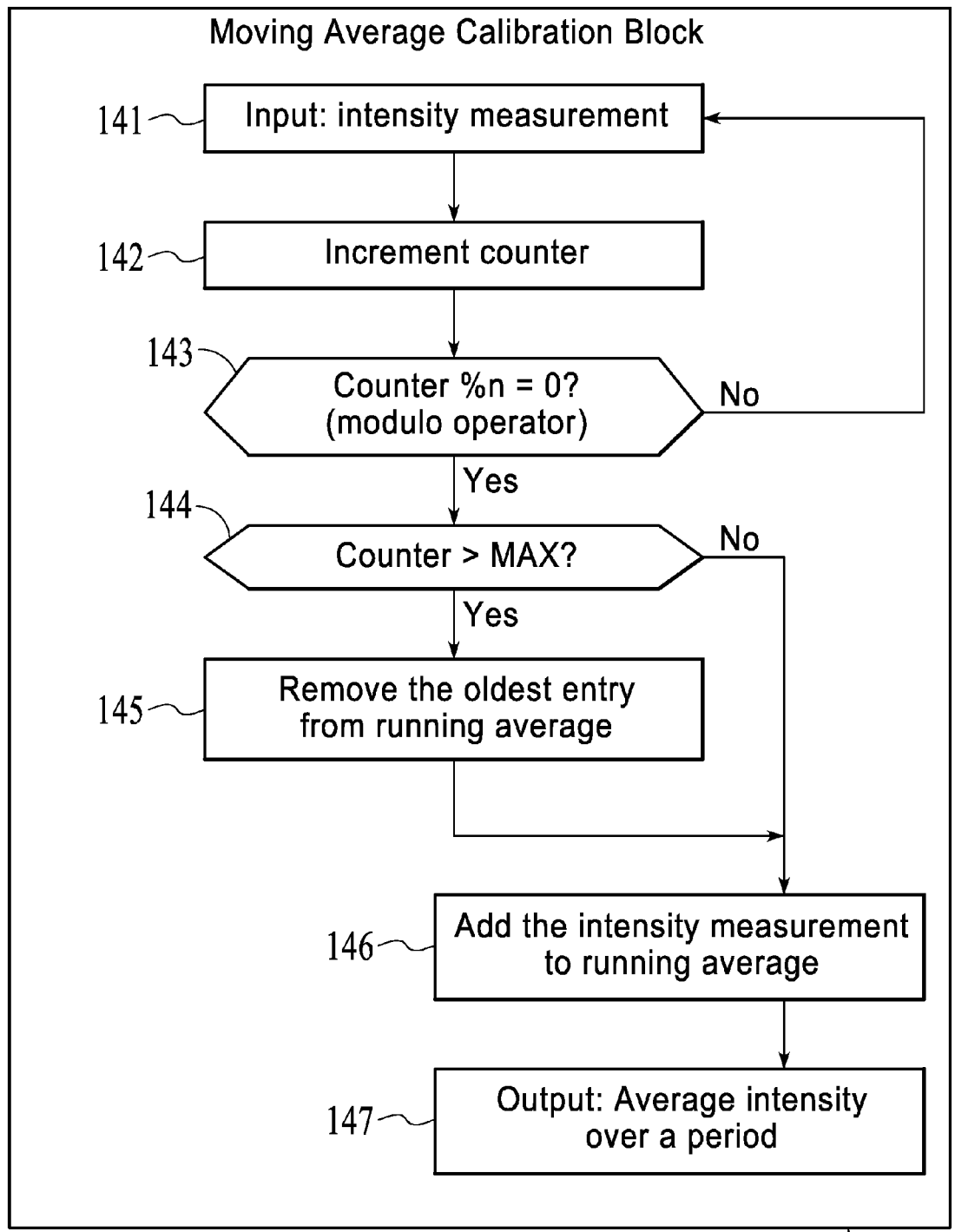
FIG. 23 illustrates moving average calibration in accordance with an implementation.

FIG. 23 illustrates operation of moving average calibration module 123. An intensity measurement is input in a block 141. In a block 142 a counter is incremented. If the counter. In a block 143, input continues until a counter condition is reached. In a block 144, another counter keeps track of the extant entries. In a block 145, if the counter exceeds a maximum value, the counter is decremented and an oldest entry is removed from the running average of intensity measurements. In a block 146 the input intensity measurement is added to the running average of intensity measurements. In a block 147, the average intensity over a predefined period is output.

Figure 24:
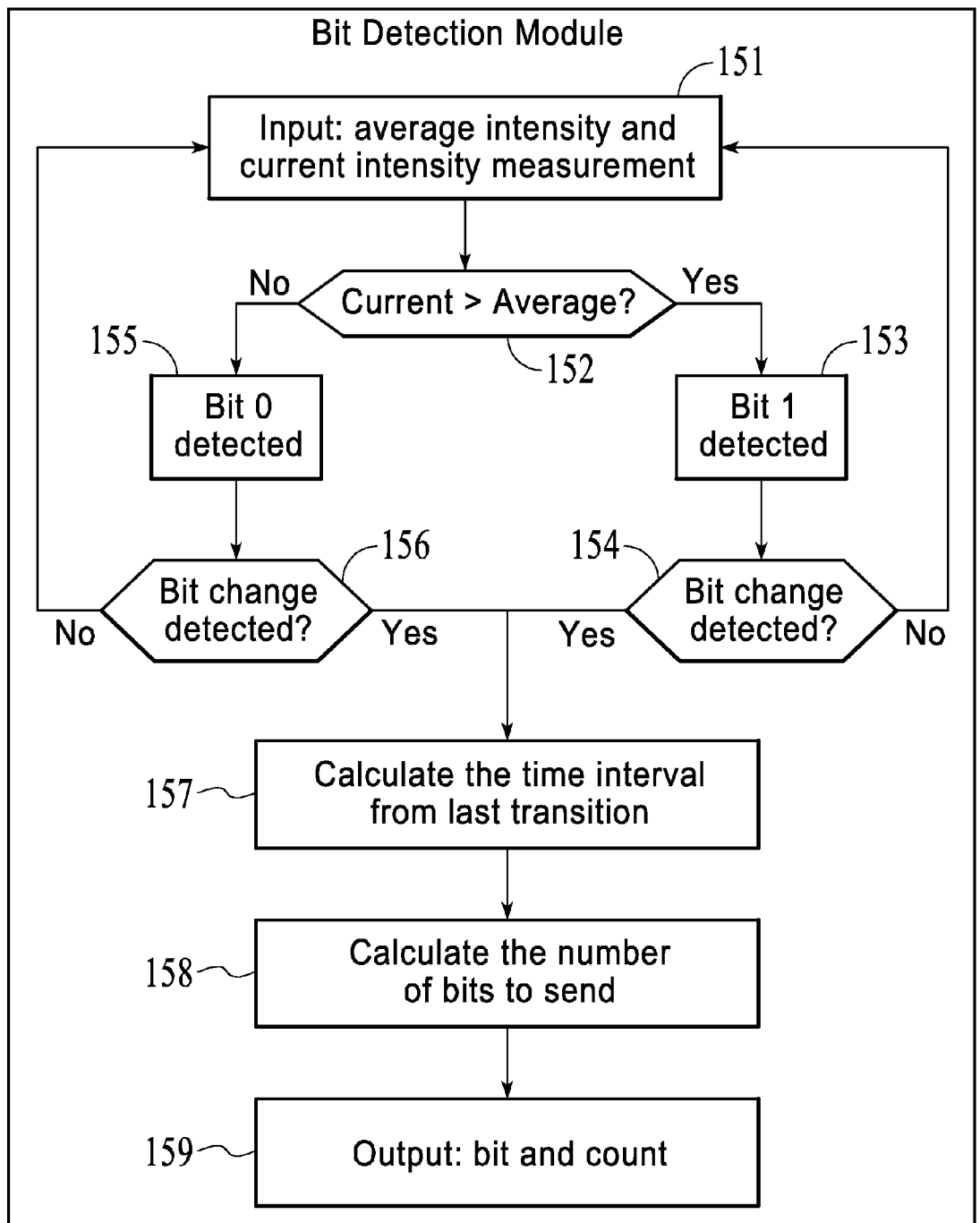
FIG. 24 illustrates logical operation of a bit detection module in accordance with an implementation.

FIG. 24 illustrates logical operation of a bit detection module 124. An average intensity measurement and a current intensity measurement are input in a block 151. In a block 152 the average intensity measurement and the current intensity measurement are compared. When the current intensity measurement is greater than the average intensity measurement, a bit value of 1 is detected in a block 153. In a block 154, if a bit value change (from 0 to 1) is detected, in a block 157, the time interval from the last bit transition is calculated. In a block 158 the number of preceding bits with a value 0 is calculated. In a block 159, the bit value and the count is sent. When in block 152 the current intensity measurement is not greater than the average intensity measurement, a bit value of 0 is detected in a block 155. In a block 156, if a bit value change (from 1 to 0) is detected, in block 157, the time interval from the last bit transition is calculated. In block 158 the number of the preceding number of bits with a value 1 is calculated. In block 159, the bit value and the count is sent.

Figure 25:
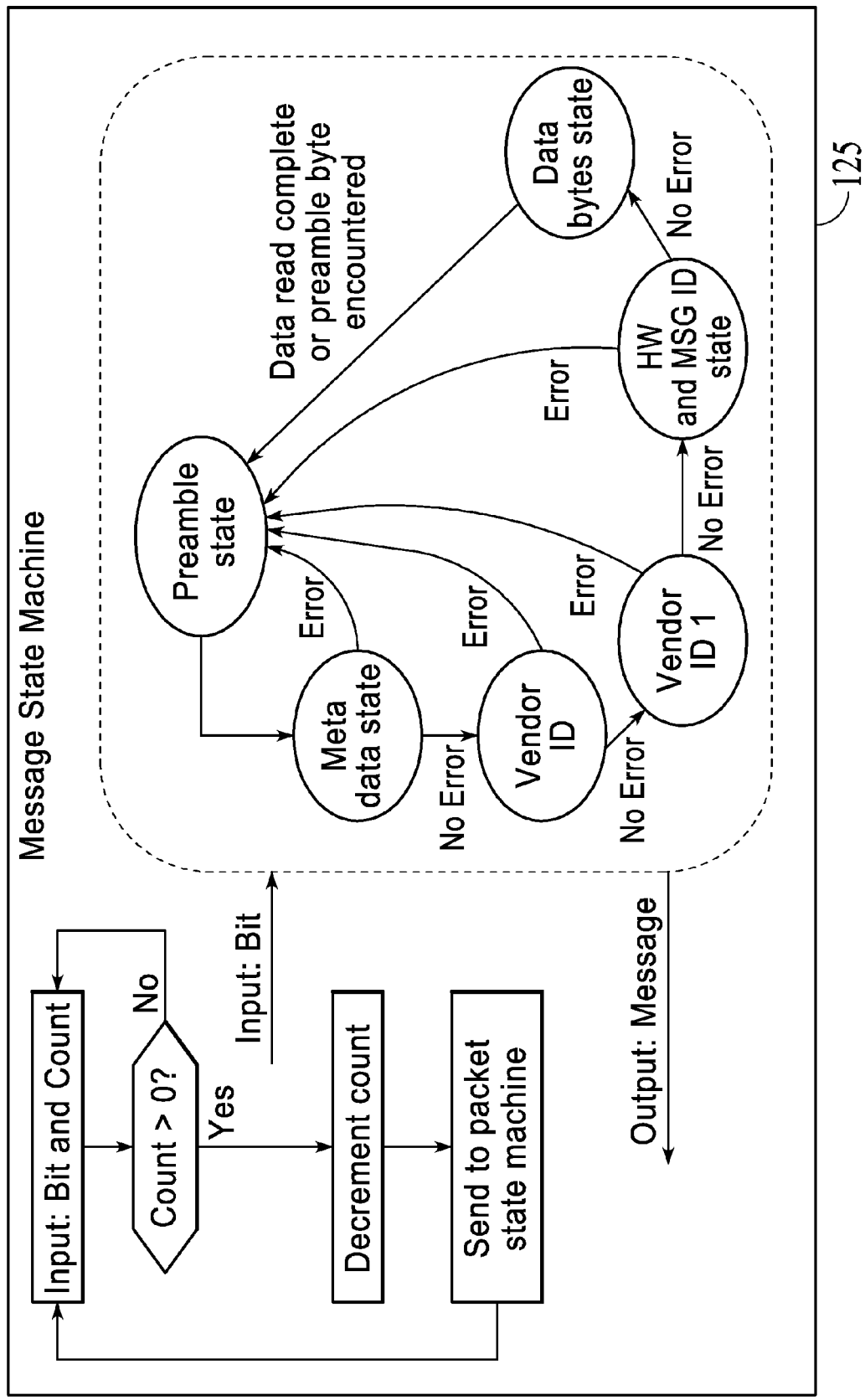
FIG. 25 illustrates a message state machine in accordance with an implementation.

FIG. 25 shows states of message state machine 125.

Figure 26:
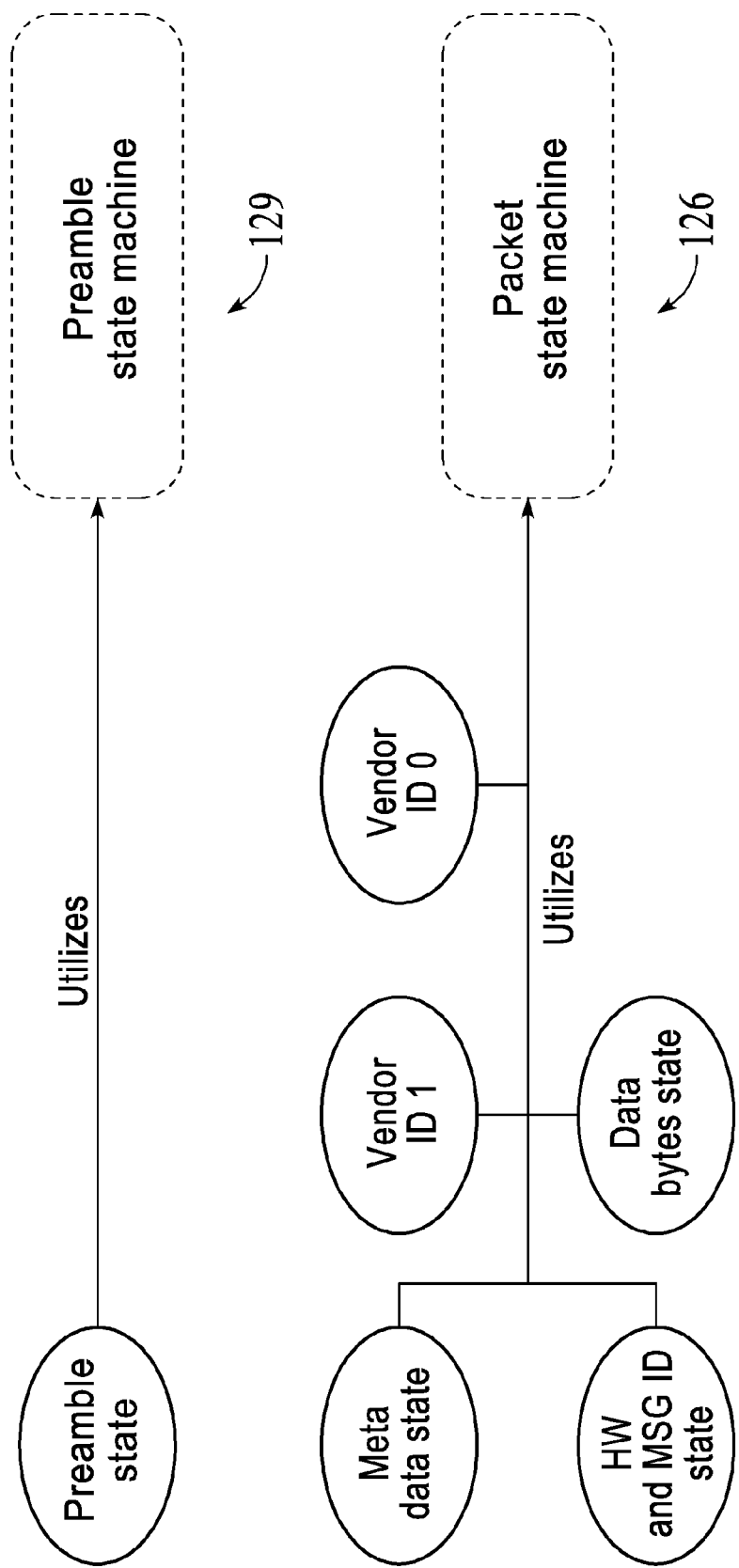
FIG. 26 illustrates use of a preamble state machine and a packet state machine in accordance with an implementation.

FIG. 26 shows a preamble state machine 129 and a packet state machine 126.

Figure 27:
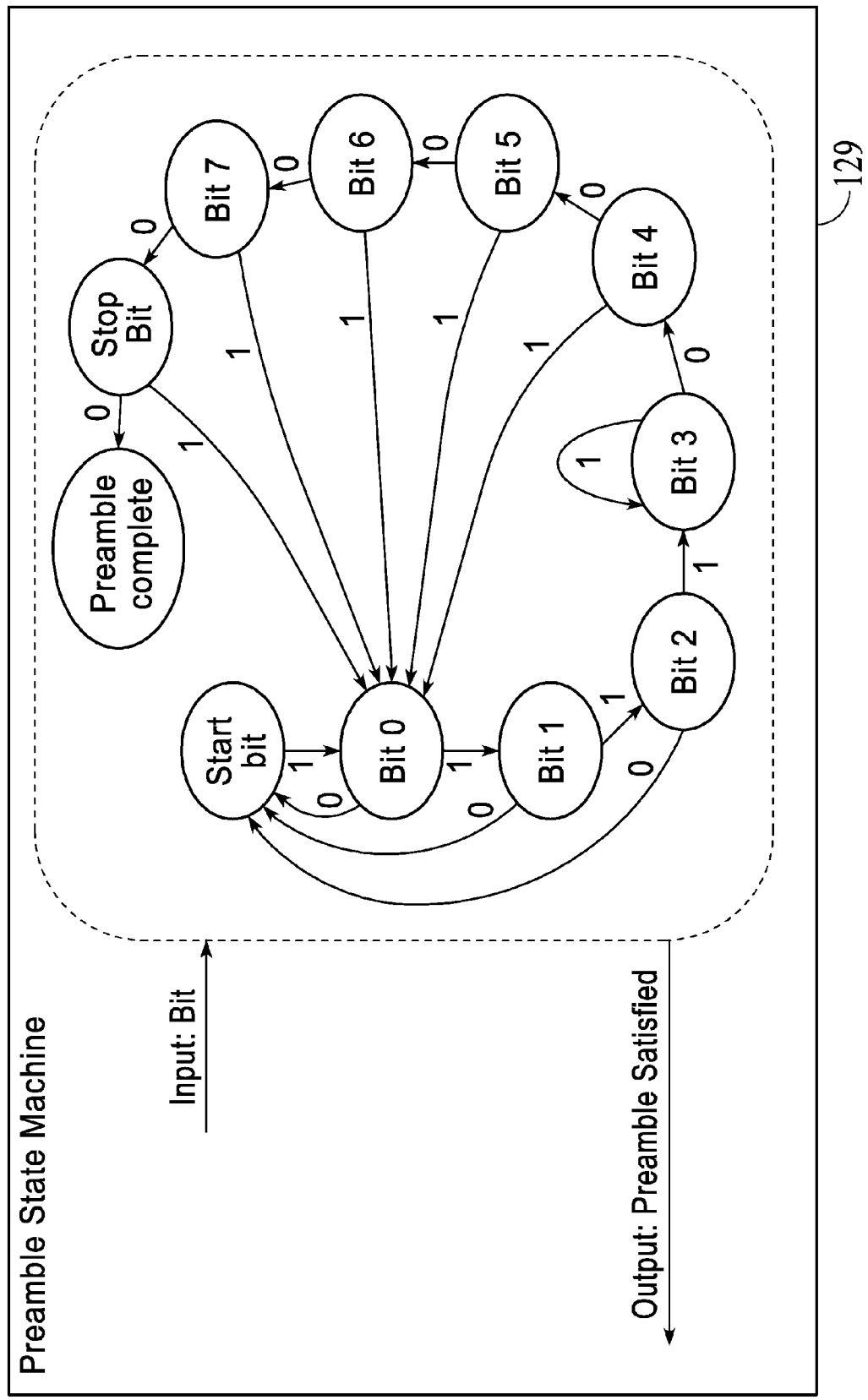
FIG. 27 illustrates operation of a preamble state machine in accordance with an implementation.

FIG. 27 shows states of preamble state machine 129.

Figure 28:
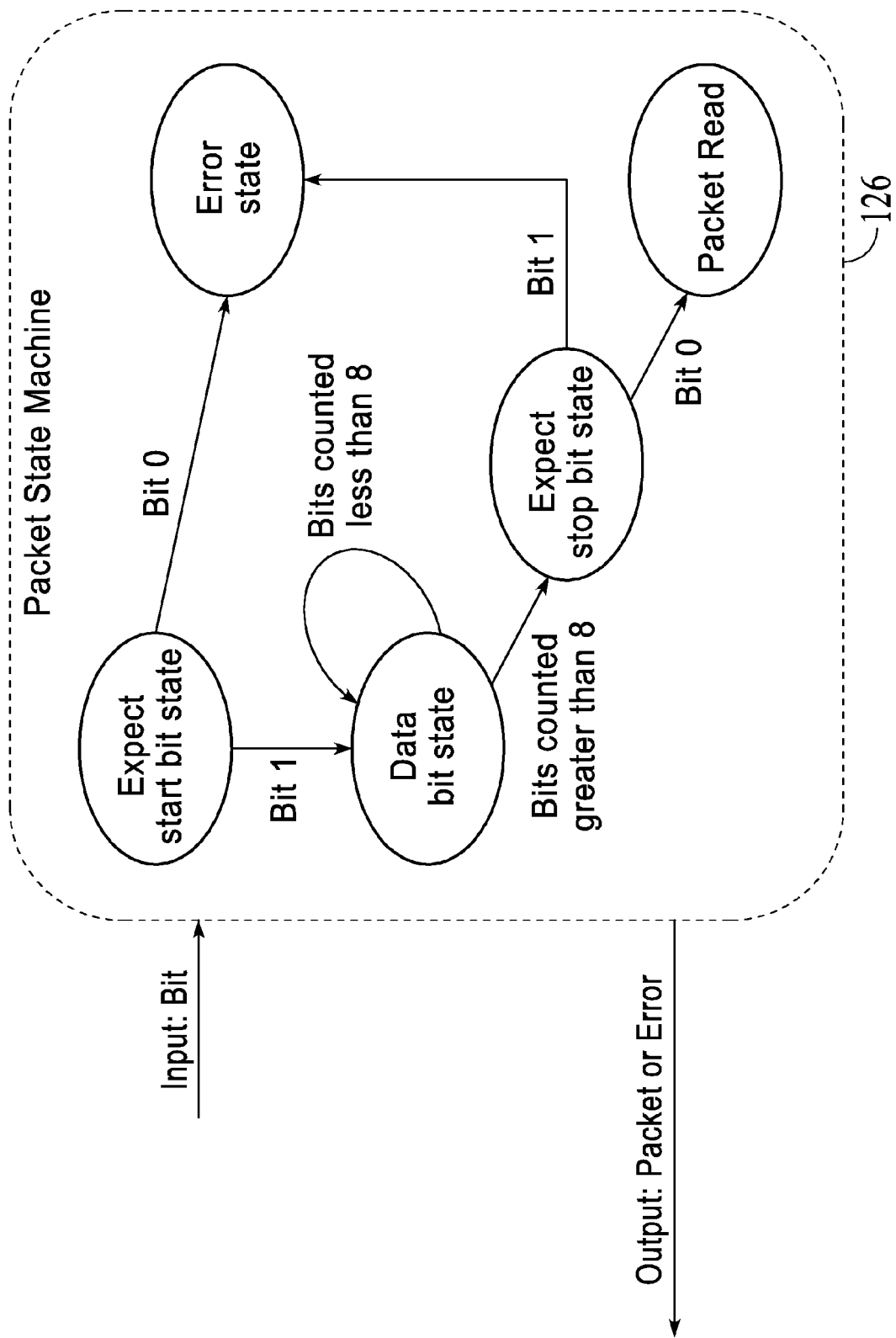
FIG. 28 illustrates operation of a packet state machine in accordance with an implementation.

FIG. 28 shows states of packet state machine 126.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A system comprising:
   a device, comprising:
      a status light,
      a microcontroller that controls blinking of the status light, and
      a memory that includes information to be broadcast by controlled blinking of the status light, the information pertaining to the device; and
   a computing device, comprising:
      a camera, and
      a decoding application that from video data captured by the camera, decodes the information broadcast by the controlled blinking of the status light;
   wherein the information is in a binary format;
   wherein the broadcast by the controlled blinking of the status light is performed synchronously so that the status light in an ON state represents a first binary value and the status light in an OFF state represents a second binary value; and
   wherein the decoding application uses dynamic averaging over a plurality of video frames to determine each binary value.

2. A system as in claim 1 wherein the status light is a light emitting device (LED).

3. A system as in claim 1 wherein the information includes a vendor identification, a device identification that identifies the device and an error code.

4. A system as in claim 1 wherein the decoding application decodes meaning of the error code using a vendor specific decode sheet.

5. A system as in claim 1 wherein the decoding application provides cross hair marking on a display screen of the computing device to facilitate a user locating the status light in a specified location of video frames.

6. A system as in claim 1 wherein the computing device is a smartphone.

7. A system as in claim 1 wherein the computing device additionally includes:
   a logging application that logs the information received from the device.

8. A system as in claim 1 wherein when the information to be broadcast by controlled blinking of the status light is broadcast by the microcontroller, the microcontroller broadcasts the information repeatedly.

9. A system comprising:
   a device, comprising:
      a status light,
      a microcontroller that controls blinking of the status light, and
      a memory that includes information to be broadcast by controlled blinking of the status light, the information pertaining to the device; and
   a computing device, comprising:
      a camera, and
      a decoding application that from video data captured by the camera, decodes the information broadcast by the controlled blinking of the status light;
   wherein the information is in a binary format;
   wherein the broadcast by the controlled blinking of the status light is performed synchronously so that the status light in an ON state represents a first binary value and the status light in an OFF state represents a second binary value; and
   wherein the decoding application interprets average light intensity as ambient light when determining each binary value.

10. A system as in claim 9 wherein the information includes a vendor identification, a device identification that identifies the device and an error code.

11. A system as in claim 9 wherein the decoding application provides cross hair marking on a display screen of the computing device to facilitate a user locating the status light in a specified location of video frames.

12. A system comprising:
   a computing device, comprising:
      a camera, and
      a decoding application that captures a video stream of a blinking status light on a device, the decoding application including:
         an intensity measurement module that measures intensity of light at a location of the status light within video frames of the video stream,
         a bit detection module that detects bit values based on the blinking status light being in an ON state or an OFF state;
      wherein the decoding application, decodes the information encoded in the detected bit values;
      wherein the information is in a binary format;
      wherein the broadcast by the controlled blinking of the status light is performed synchronously so that the status light in an ON state represents a first binary value and the status light in an OFF state represents a second binary value;
      wherein the decoding application uses dynamic averaging over a plurality of video frames to determine each binary value.

13. A system as in claim 12 the decoding application additionally comprises:
   a message state machine that tracks a state of a message that encloses the information; and,
   a packet state machine that tracks a state of a packet that forms a part of the message.

14. A system as in claim 12 wherein color of status light is used to provide additional information.

15. A system as in claim 12 wherein transmission rate is varied by varying duty cycle of blinking and varying a number of status lights that are blinking.

16. A system comprising:
   a computing device, comprising:
      a camera, and a decoding application that captures a video stream of a blinking status light on a device, the decoding application including:
  an intensity measurement module that measures intensity of light at a location of the status light within video frames of the video stream,
  a bit detection module that detects bit values based on the blinking status light being in an ON state or an OFF state;
wherein the decoding application, decodes the information encoded in the detected bit values; and
wherein the decoding application provides cross hair marking on a display screen of the computing device to facilitate a user locating the status light in a specified location of video frames.

17. A system as in claim 16 the decoding application additionally comprises:

a message state machine that tracks a state of a message that encloses the information; and,
a packet state machine that tracks a state of a packet that forms a part of the message.

18. A system as in claim 16:
wherein the information is in a binary format; and
wherein the broadcast by the controlled blinking of the status light is performed synchronously so that the status light in an ON state represents a first binary value and the status light in an OFF state represents a second binary value.

19. A system as in claim 16 wherein color of status light is used to provide additional information.

20. A system as in claim 16 wherein transmission rate is varied by varying duty cycle of blinking and varying a number of status lights that are blinking.

* * * * *